May 10, 1938.   J. PAVLECKA   2,117,117
ENGINE STRUCTURE
Filed Nov. 19, 1935

INVENTOR:
John Pavlecka

Patented May 10, 1938

2,117,117

UNITED STATES PATENT OFFICE 2,117,117

ENGINE STRUCTURE

John Pavlecka, Detroit, Mich.

Application November 19, 1935, Serial No. 50,552

16 Claims. (Cl. 123—173)

My present invention relates more particularly to a new manner of supporting and cooling crankshaft bearings in internal combustion engines.

One object of my invention is to devise transverse bulkheads for supporting main bearings in piston engines which will extend uninterruptedly through the engine structure through openings therein, and closure means around these openings for conveying cooling fluid to the bearings and to and from the engine cooling jacket.

An important object of this invention is to introduce cooling fluid to the bearings in internal combustion engines through hollow bulkheads supporting the same, and moreover, to surround the bearings completely with the cooling fluid by providing an open passage for it to and through the usual bearing caps.

Another object is to cool lubricating oil directly in the bearings and particularly in the bearing caps by water jacketing the same, and thereby eliminate external oil coolers and allow for higher rotational speeds and loads on the bearings.

An object of no little importance is to introduce cooling fluid into engines through crankcase walls and through bulkheads supporting the crankshaft therein for the purpose of cooling oil in the crankcase and in the crankshaft bearings, the manifold introducing the fluid being preferably comprised within the crankcase to provide additional cooling surface.

The manner in which these objectives and various advantages accruing therefrom are materialized is disclosed in several typical embodiments of my invention as shown in the drawing forming an integral part of this specification.

Referring first to all the figures in general, an engine embodying my invention is characterized essentially by a number of cylinders arranged in any relation of one to another and enveloped by a cooling jacket; each cylinder comprises one or two pistons which actuate through connecting rods one or more crankshafts. The crankshafts are mounted in a number of bearings which are supported in alinement by an equal number of bulkheads and complemental bearing caps; for purposes of my present invention these bulkheads are made hollow in their bearing carrying extremities so that the cavities formed in them will be in open communication with the cooling jacket around the cylinders. In engines embodying two or more parallel crankshafts, the transverse bulkheads constitute preferably individual single or double webbed plane members between adjacent cylinders; each bulkhead has a number of extremities projecting from a central body within the cooling container into the several crankcases and supporting the crankshaft bearings therein; the extremities of the bulkheads are preferably hollow as provided readily in double-webbed bulkheads, or if single-webbed, they are made hollow by employing auxiliary side walls whereby cooling fluid from the cylinder jacket will flood the whole extremity of the bulkhead up to the bearing.

Figure 1:
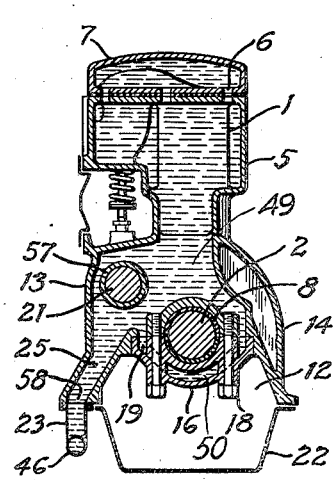
Fig. 1 represents a transverse cross-section through an engine having a number of cylinders arranged "in line", and showing the proposed manner of introducing cooling fluid to the bearings, into hollow bearing caps, and into the cylinder cooling jacket, through hollow bulkheads.
Figure 2:
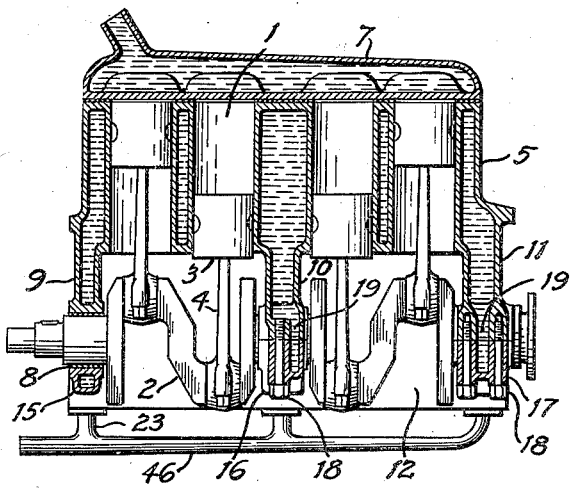
Fig. 2 is a longitudinal cross-section through the same engine, and shows the transverse bulkheads and the hollow bearing caps supporting the crankshaft bearings and containing cooling fluid, and means for introducing the fluid into the bulkheads.

Referring now specifically to Figs. 1 and 2, the engine represented therein comprises a plurality of cylinders 1 and one crankshaft 2 in juxtaposition thereto. Each cylinder has one piston 3 in it, the piston being journalled to the crankshaft 2 by means of the connecting rod 4. The cylinders 1 are surrounded collectively by the cooling jacket 5 which is normally filled with a cooling fluid.

The crankshaft 2 is supported in bearings 8;

these bearings are deposited in transverse bulkheads 9 to 11 which, in this particular embodiment, are homogeneous with the remainder of the engine structure or frame. Complemental to the bulkhead 9 to 11 in retaining the bearings 8 are the caps 15 to 17, respectively, each of which is secured to its bulkhead by means of at least two studs or bolts 18.

The bulkheads 9 to 11 are hollow in their body, as by being constituted of two spaced walls between the crankcase walls 13 and 14; the resulting cavity in the bulkheads is in open communication with the cooling jacket 5, at the far end surrounds the upper half of the crankshaft bearings 8, and on one side envelops the camshaft bearing 57.

In the preferred construction as shown, the bearing caps 15 to 17 are made likewise hollow in their body angularly between the studs 18 and alongside of them whereby the rigidity of the caps will be materially increased and cooling of the bearings 8 effected all around their periphery. The admission of the cooling fluid into the caps is accomplished through passages 19 which communicate between the bulkhead cavity 49 and the bearing cap cavity 50; the passages 19 are located either on the side of the studs 18 in case only one stud is employed at each end of the cap, as in cap 16, or between the studs 18 in case two of them are used at each end, as in cap 17.

For delivery of cooling fluid into the engine a manifold 46 is employed; this manifold extends alongside of the oil pan 22 and has a number of branches 23 connecting to intake openings 58 in passages 25; the passages 25 are cast in the crankcase wall 13 and through it discharge the fluid into the several bulkheads 9 to 11, the fluid being jetted into the bulkheads at high velocity whereby rapid withdrawal of heat from the oil on their walls and in the bearings 8 and 57 is obtained.

Figures 3, 4:
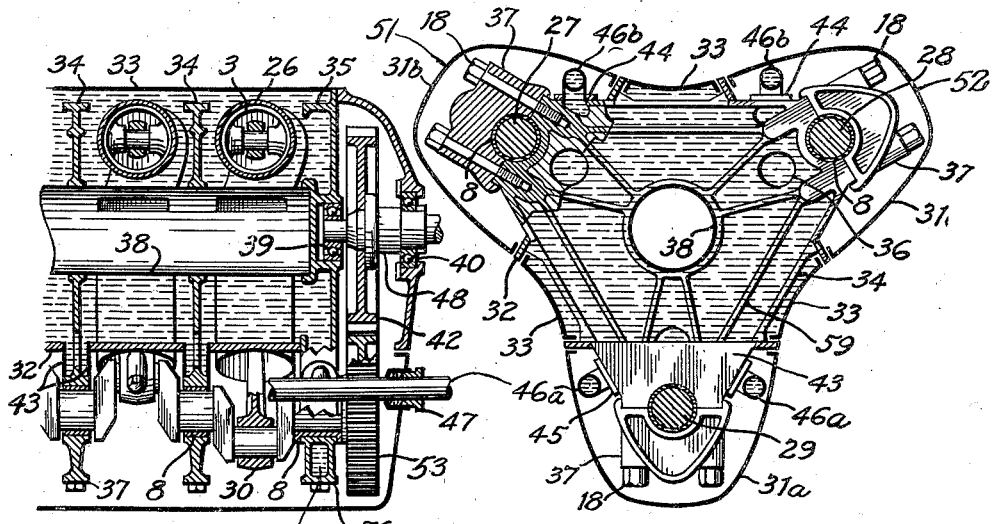
Fig. 3 is a longitudinal cross-section through a multiple cylinder engine such as has been disclosed in my Patent No. 2,085,270, in which three crankshafts are supported by a number of transverse bulkheads in angularly spaced relation, and cooling fluid is introduced into the engine through the crankcase of one of the crankshafts and discharged through the other two crankcases.
Fig. 4 is a transverse cross-section through the engine of Fig. 3 and shows one of the bulkheads, the upper left extremity of which is sectionalized in its plane of symmetry, and the upper right extremity of which is viewed without the side web such as covers the bottom extremity.
Figure 5:
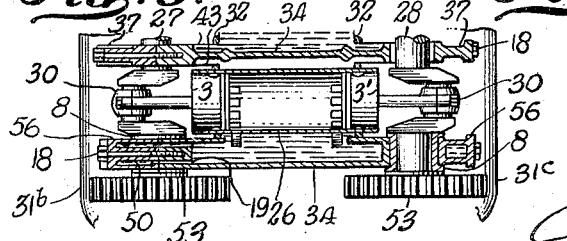
Fig. 5 is a cross-section through the engine of Figs. 3 and 4, taken in the plane of two of the crankshafts and the cylinders therebetween at the forward end of the engine; the left side of the cross-section is carried out through the bearing cap bolts as indicated by 5l in Fig. 4, while the right side continues through the center of the bearing cap as indicated by 52.

Referring now to Figs. 3, 4 and 5, the engine represented therein comprises a number of banks of cylinders 26, the cylinders being arranged in a generally polygonal formation; in the particular engine as shown, each bank consists of three cylinders disposed to form a triangle; at the apices of this triangle are located the three crankshafts 27 to 29. Each cylinder 26 contains two opposed pistons 3 and 3' which are journalled to two of the crankshafts by means of connecting rods 30. The cylinders 26 are submerged between their ends in cooling fluid, the ends of the cylinders protruding into the crankcases 31a, 31b and 31c through three decks 32 which, jointly with intervening panels 33, form a prismatic box serving as the cooling jacket for the cylinders.

The three crankshafts 27 to 29 are supported by a number of transverse bulkheads, one single-webbed bulkhead 34 between each two banks of cylinders, and one double-webbed bulkhead 35 at the front end of the engine. Both types of these bulkheads may be defined as substantially polygonal or, more specifically, triangular rigid slabs provided with stiffening ribs 59 and with perforated circulation holes 36; the corner extremities of the bulkheads 34 and 35 protrude through the decks 32 from the cooling jacket into the crankcases 31, and therein seat the bearings 8.

The bearings 8 are deposited from one half in the bulkheads 34 and 35 proper, their other half being held in the bearing caps 37 and 56, respectively; these caps are bolted down onto the bulkheads by means of the studs or bolts 18. In their center, the bulkheads 34 are provided with an opening through which passes the induction duct 38. The end bulkhead 35 carries centrally the bearing 39 which, together with the bearing 40, supports the main drive shaft 48. This shaft 48 is geared to the crankshafts 27 to 29 by means of the central gear 42 and three pinions 53, one on each crankshaft.

Both types of bulkheads 34 and 35 are characterized in that their extremities carrying the bearings 8 at a distance from the decks 32 contain a cavity for admitting cooling fluid to the proximity of the bearings. This cavity obtains readily in a double webbed bulkhead, such as 35, in which two spaced walls protrude through the decks 32 into the crankcase and support the bearings 8 therein, the space between their walls being flooded with cooling fluid from the cylinder cooling jacket.

The structure of the single webbed bulkheads 34 is distinguished in that their stress carrying web extends uninterruptedly through the cooling space or container along the cylinders 26 therein and through the decks 32 between the opposite bearings 8. This is realized by providing clearance holes in the decks 32 for the bearing extremities of the bulkheads; these extremities have flanges thereon bordering along their web and extending to and through the clearance holes in the decks 32 to the underside thereof and forming two spaced seating pads or shoulders thereat; in the embodiment shown, the bulkheads and the decks are also joined together at these two seating points, as by fusion. Furthermore, in order to obtain a fluid cavity similar to that in bulkhead 35, closure plates 43 are abutted on and secured, as by fusion, to the decks 32, to the flanges on the bulkhead extremities, and to the bearing seat thereon. Through this construction is materialized not only the desirability of cooling the main bearings in an engine, but moreover, the web of the bulkheads remains continuous throughout its span between the bearings and unimpaired by fusion heat in fabrication or local stresses in the decks thereafter.

Similarly as in the engine of Figs. 1 and 2, the bearing caps in this engine may be made hollow and the bearings 8 cooled all around their diameter; this construction is represented in Figs. 3 and 5, wherein the bulkhead 35 is provided with hollow bearing caps 56 into the cavity 50 of which cooling fluid is admitted in a manner analogous to that in the bearing caps 15 to 17 of Fig. 2, i. e., through passages 19 alongside of the bolts 18, Fig. 5.

The introduction of the cooling fluid into the engine of Figs. 3 and 4 is accomplished in a manner similar to that shown in Fig. 1, the fluid being delivered into the cooling jacket through the bulkheads 34 and 35 in the proximity of the bearings 8; the fluid is introduced into the engine through the lowest extremities of the bulkheads in the bottom crankcase 31a, and is withdrawn through the same bulkheads in the upper two crankcases 31b and 31c.

For the admission and withdrawal of the cooling fluid flanged openings are provided in the bulkheads 34 and 35 at points 45 in the bottom crankcase 31a, and manifolds 46a are made use of to supply the fluid to these points from the outside of the crankcase. Corresponding openings are provided in the bulkheads in the crankcases 31b and 31c at points 44 for the discharge of the fluid into the manifolds 46b and through them to the exterior of the engine.

The manifolds 46a and 46b extend in the crankcases 31a, 31b and 31c outside of the orbit of the crankshafts 27 to 29 and the connecting rods 30 thereon, and at one end project through the end wall of the crankcases exteriorly. A sealing means, such as the stuffing box 47, is employed to close the clearance between the manifolds 46a and 46b and the respective crankcases. In the embodiment of Fig. 3, the manifold 46a is shown as passing through the front of the crankcase 31a, which is for purposes of illustration only as normally it would pass through the rear of the crankcase in order to avoid interference with the pinion 53.

I claim:

1. The combination in an internal combustion engine, with engine means including cylinders and a number of juxtaposed crankshafts, of a box-like frame surrounding said cylinders and containing cooling fluid therefor, and of bulkheads disposed transversely within said frame and projecting exteriorly therefrom for supporting said crankshafts rotatably and in direct communication with one another, said bulkheads being double webbed and hollow outside of said frame, and means for introducing cooling fluid into said hollow portion of the bulkheads and through them into said frame at certain of said crankshafts and for discharging said fluid from said bulkheads at others of said crankshafts.

2. In an internal combustion engine in combination, engine means consisting of cylinders open at both ends thereof, twin opposed pistons in each cylinder, at least two crankshafts disposed a piece at the ends of said cylinders, connecting rods journalling said pistons to said crankshafts, a box frame enclosing said cylinders and providing a cooling fluid jacket therefor, individual crankcases abutting on said frame and housing said crankshafts, transverse bulkheads parallel to and alternating with said cylinders, said bulkheads having the body thereof within said box frame and therefrom protruding into said crankcases and supporting said crankshafts rotatably therein, the portion of said bulkheads in said crankcases being hollow and in open communication with said box frame and being provided with openings, certain of said openings providing entry for cooling fluid into said bulkheads, and through them into said frame, others of said openings providing exit for said fluid, and intake and discharge manifolding registering with said respective openings.

3. In an internal combustion engine in combination, a plurality of sets of cylinders, each set being made up of three cylinders having co-planar and intersecting axes, three crankshafts disposed in a triangular formation at the intersections of said axes, twin opposed pistons in each of said cylinders connected each to a different crankshaft, a box frame enclosing said cylinders and providing a cooling fluid jacket therefor, said frame comprising three decks parallel to said crankshafts, a crankcase abutting on each of said decks and housing one of said crankshafts therein, transverse bulkheads alternating with said cylinder sets within said box frame and therefrom protruding outwardly into said crankcases and mounting said crankshafts rotatably therein, the portions of said bulkheads in said crankcases being hollow and in open communication with said box frame and being provided with intake and discharge openings for cooling fluid, and intake and discharge manifolds registering with said respective openings, said manifolds being enclosed within said crankcases and through them projected exteriorly.

4. A piston engine comprising, engine means including cylinders with opposed pistons therein, a number of crankshafts, a box-like frame surrounding said cylinders and containing cooling fluid therefor, transverse bulkheads disposed alongside of said cylinders within said frame and projected exteriorly therefrom for supporting said crankshafts rotatably in juxtaposition to said cylinders and in direct communication with one another for equalization of stresses, said bulkheads being hollow outside of said frame and filled with cooling fluid therefrom, and manifold means for introducing cooling fluid individually into each of said bulkheads in the proximity of certain of said crankshafts and for withdrawing said fluid from said bulkheads in the proximity of others of said crankshafts.

5. A piston engine comprising, engine means including cylinders with opposed pistons therein, a number of crankshafts and bearing means therefor, a box-like frame surrounding said cylinders and containing cooling fluid therefor, transverse bulkheads disposed alongside of said cylinders within said frame and projected exteriorly therefrom, bearing caps abutting on and complementing said bulkheads in supporting said bearing means and crankshafts in direct communication with one another for equalization of stresses, said bulkheads being hollow outside of said frame and filled with cooling fluid therefrom, said bearing caps being likewise hollow and in open communication with the interior of said bulkheads for receiving cooling fluid therefrom whereby said bearing means will be cooled all around their circumference.

6. A piston engine comprising, engine means including cylinders with opposed pistons therein, a number of crankshafts and bearing means therefor, a box-like frame surrounding said cylinders and containing cooling fluid therefor, transverse bulkheads disposed alongside of said cylinders within said frame and projected exteriorly therefrom, bearing caps complemental to said bulkheads in supporting said bearing means and crankshafts in juxtaposition to said cylinders and in direct communication with one another for equalization of stresses, said bulkheads being hollow outside of said frame and filled with cooling fluid therefrom, said bearing caps being likewise hollow and in open communication with the interior of said bulkheads for receiving cooling fluid therefrom, and manifold means connecting individually to each of said bulkheads outside of said frame for feeding cooling fluid thereinto and withdrawing same therefrom.

7. In a piston engine, engine means including a cylinder or cylinders in a cooling fluid jacket, at least one crankshaft and bearings therefor, transverse bulkheads extending from said cylinder jacket to said crankshaft and forming a seat for said bearings thereof, said bulkheads having a central web and flanges bordering therealong for stress carrying, and closure walls connecting said flanges and therewith forming a fluid container between said bearing seat and said cylinder jacket for flooding said bearing seat with cooling fluid.

8. In a piston engine, engine means including a cylinder or cylinders in a cooling fluid jacket, at least one crankshaft and bearings therefor, transverse bulkheads extending from said cylinder jacket to said crankshaft and forming a seat for said bearings thereof, said bulkheads comprising a central stress carrying web and flanges bordering therealong, closure walls connecting said flanges and therewith forming a fluid container between said bearing seat and said cylinder jacket for admitting cooling fluid to said seat, hollow and detachable bearing caps complementing said bulkheads in forming said bearing seat, said bearing caps having openings alongside of said bearing seat registering with like openings in said bulkheads between said central web and said closure walls thereof for flooding said bearing caps with cooling fluid, and screw means securing said bearing caps firmly in place and thereby establishing a leak-proof passage for said fluid through said openings.

9. In a piston engine, engine means including a cylinder or cylinders in a cooling fluid jacket, at least one crank-shaft and bearing means therefor, transverse bulkheads extending from said cylinder jacket to said crankshaft and forming a seat for said bearings thereof, said bulkheads comprising a central stress web and flanges bordering therealong, closure walls on each side connecting said flanges to form two fluid containers along said central web between said bearing seat and said cylinder jacket, hollow and detachable bearing caps complementing said bulkheads in forming said bearing seat, said bearing caps having openings alongside of said bearing seat registering with like openings in said bulkhead containers for admission of cooling fluid therefrom into said bearing caps, means for securing said bearing caps firmly to said bulkheads and thereby rendering the junction between said fluid openings thereof leak-proof, and fluid passages connecting to said flanges on said bulkheads for conveying cooling fluid to and from said cylinder jacket through said bulkhead containers and thereby causing circulation of fluid around said bearing seat.

10. In a piston engine, a cooling fluid container, and at least one transverse bulkhead partly in said container and partly projecting therethrough to form a remote bearing seat, said container having a clearance hole around said projecting part of said bulkhead, and closure means for said clearance hole extending from said fluid container to said bearing seat for admitting cooling fluid thereto.

11. In a piston engine, engine means including a crankshaft, a deck paralleling said crankshaft, and at least one single-webbed stress carrying bulkhead disposed transversely to said deck and secured thereto at two spaced points and between said points projecting through said deck toward said crankshaft and forming a bearing seat therefor, said deck having a clearance hole between said securing points for said bulkhead, and closure means for said clearance hole extending from said deck between said securing points thereon to said bearing seat whereby the web of said bulkhead will be uninterrupted and unaffected by said deck.

12. In a piston engine, engine means including a cylinder or cylinders, at least one single-webbed bulkhead along each cylinder forming a bearing seat away from said cylinder, a deck supporting said cylinder or cylinders and forming a wall of a cooling fluid container therefor and supporting said bulkhead at two border points thereof and between said two points having a clearance hole whereby said web of said bulkhead will project through said deck uninterruptedly, and closure means between said deck and said bearing seat of said bulkhead and laterally between said border points thereof for admitting cooling fluid to said bearing seat thereof.

13. A piston engine comprising, a cooling fluid container, at least one transverse single-webbed bulkhead partly in said container and partly projecting therethrough to form a remote bearing seat, said projecting part of said bulkhead having flanges bordering along said web thereof between said fluid container and said bearing seat, said fluid container having a clearance hole along said bulkhead web between said flanges thereon whereby said web will be continuous through said fluid container, and closure walls extending between said flanges on said bulkhead and said fluid container whereby cooling fluid will be admitted to said bearing seat through said clearance hole.

14. A piston engine comprising, engine means including a cylinder or cylinders in a cooling fluid container, a crankcase and a crankshaft therein, a deck in said crankcase forming a wall of said fluid container and supporting said cylinder or cylinders therein, at least one transverse bulkhead comprising one stress carrying web encompassed within said fluid container transversely to said deck and projecting through said deck into said crankcase and forming a bearing seat for said crankshaft therein, said deck having a clearance hole along said bulkhead web whereby said web remains uninterrupted, closure means for said hole extending between said deck and said bulkhead and forming a fluid cavity in said crankcase, and manifold means entering said crankcase and connecting to said cavity for delivery of cooling fluid into and withdrawal of same from said fluid container through said clearance hole in said deck.

15. A piston engine comprising, a cooling fluid container, at least one transverse single-webbed bulkhead partly in said container and partly projecting therethrough to form a remote bearing seat, said projecting part of said bulkhead having flanges bordering along said web thereof between said fluid container and said bearing seat, said fluid container having a clearance hole along said bulkhead web between said flanges thereon whereby said web will be continuous through said fluid container, closure plates abutting said flanged projecting part of said bulkhead between said clearance hole therealong and said bearing seat thereon to form a fluid cavity, said projecting part of said bulkhead having an aperture in said flanges thereof, and a fluid manifold connecting to said aperture for feeding cooling fluid into or withdrawing same from said fluid container through said bulkhead cavity.

16. A piston engine comprising, engine means including an open end cylinder or cylinders, at least one bulkhead along each cylinder forming bearing seats beyond the ends thereof, two spaced decks supporting said cylinder ends and forming opposite walls of a fluid container, said decks supporting likewise said bulkhead at the border edges thereof and having clearance holes along said bulkhead between said border edges thereof whereby the body of said bulkhead will be continuous between said bearing seats, and closure means between said decks and said bearing seats of said bulkhead and laterally between said border edges thereof to form fluid cavities outside of said fluid container for cooling said bearing seats and conveying fluid into and from said container.

JOHN PAVLECKA.